(No Model.)

M. A. ANDREWS.
JOURNAL BEARING.

No. 429,554. Patented June 3, 1890.

Witnesses
Howard P. Denison
F. F. Denison

Inventor
Marian A. Andrews
By his Attorneys
Smith & Denison

UNITED STATES PATENT OFFICE.

MARION A. ANDREWS, OF SYRACUSE, NEW YORK.

JOURNAL-BEARING.

SPECIFICATION forming part of Letters Patent No. 429,554, dated June 3, 1890.

Application filed December 26, 1889. Serial No. 334,910. (No model.)

*To all whom it may concern:*

Be it known that I, MARION A. ANDREWS, of Syracuse, in the county of Onondaga, in the State of New York, have invented new and useful Improvements in Journal-Bearings, of which the following, taken in connection with the accompanying drawings, is a full, clear, and exact description.

My invention relates to the construction of journal and other bearings, and especially to that class known as "anti-friction" bearings, and which are designed to reduce the friction of the axle or shaft rotating therein, and especially when carrying a load.

My object is to produce an anti-friction journal-bearing which requires no oiling, in which a ring bears frictionally upon the top of the axle, grooved rollers fit inwardly upon an endless trackway upon the periphery of the ring and outwardly upon an endless trackway upon the inner wall of the casing, and in general I produce a bearing in which the axle is grooved to fit an endless trackway within the ring and the friction-rollers or wheels travel upon endless trackways, the rollers being mounted upon separate axles, so that they do not rub against each other.

My invention consists in the several novel features of construction and operation hereinafter described, and specifically set forth in the claims annexed hereto. It is constructed as follows, reference being had to the accompanying drawings, in which—

Figure 1:
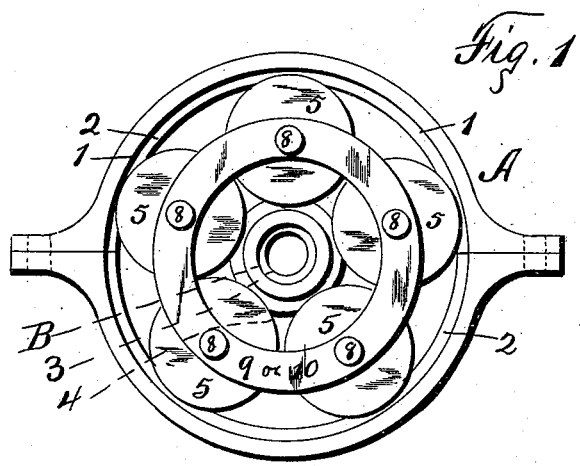
Figure 2:
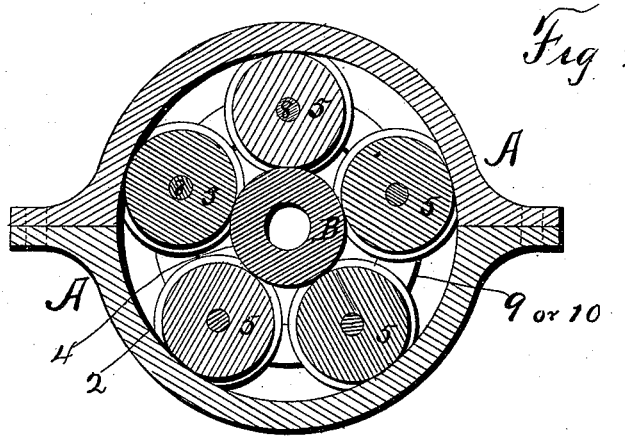
Figure 3:
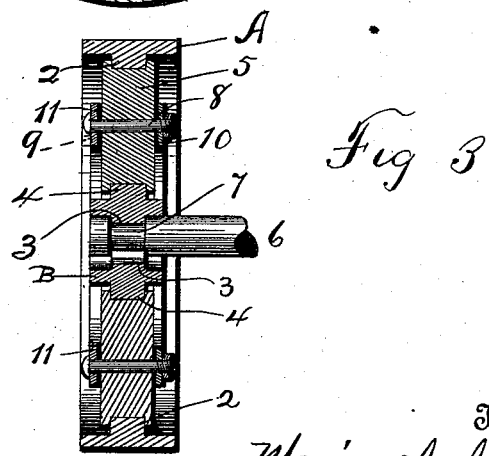

Figure 1 is a front elevation with the cap or cover removed. Fig. 2 is a vertical transverse section. Fig. 3 is a section taken on radial lines from the center outward through the centers of two friction-rollers.

A is the casing constructed in sections, which together comprise an inner circular bearing-face. 1 and 2 represent an endless trackway secured upon or integral with the inner wall of the casing.

B is the axle or shaft ring, having an endless internal trackway 3, and an endless trackway 4 around its periphery. Between and adapted to travel upon the trackways 2 and 4, I place the grooved friction rollers or wheels 5 between the ring B and the casing A. The axle 6 is smaller than the bore of the ring and fits loosely therein, as shown, the axle being also grooved, as at 7, which groove fits over the trackway 3 in the ring B.

The rollers 5 are separately mounted in arbors 8, which are in turn mounted in annular rings 9 and 10, and 11 represents graphite or other anti-friction washers interposed around the arbors and between the inner face of the rings and the outer face of the rollers, and these arbors hold the rollers away from each other, so that one cannot touch or rub or travel upon the adjoining roller, but all are free to travel together upon their trackways.

It will be seen that the shaft of the axle rotates against the inner trackway of the central ring, and thus carries said ring around, and that the friction-rollers actuated by the rotation of the ring also travel upon inner and outer trackways; also, that the axle is considerably smaller than the bore of the ring, so that when weight is applied the axle supports the ring; also, that by reducing the size of the ring the axle bears with greater frictional contact against the upper side of the ring. It will also be observed that the front and rear of the bearing can be provided with an ordinary cap or cover to close the same and keep out the dust and grit. It will be further seen that by the use of the endless trackway in the ring all end-thrust of the axle is prevented.

What I claim, and desire to secure by Letters Patent, is—

1. A sectional journal-casing having an endless trackway within it, a central ring having endless trackways upon its inner and outer faces, and grooved rollers traveling upon the trackway within the casing and upon the outer face of the ring, in combination with an axle grooved to fit over the trackway within the ring and passing loosely through the ring, as set forth.

2. A friction-ring having an endless trackway within it, an endless trackway around its exterior, an axle grooved to fit upon the trackway within the ring, an exterior casing having an endless trackway within it, grooved rollers fitting over the external trackway upon the ring and the internal trackway of the said casing, and annular rings carrying separate arbors for the grooved rollers, in combination, as set forth.

3. A journal-bearing comprising an external casing having an internal trackway, grooved rollers mounted upon separate arbors, rings supporting said arbors, anti-friction washers upon said arbors, the grooved shaft, and the central ring having internal and external trackways and a bore of larger diameter than the axle, as set forth.

In witness whereof I have hereunto set my hand this 18th day of December, 1889.

MARION A. ANDREWS.

In presence of—
HOWARD P. DENISON,
F. T. DENISON.